US012709094B2

(12) United States Patent
Hamada et al.

(10) Patent No.: US 12,709,094 B2
(45) Date of Patent: Aug. 18, 2026

(54) LIQUID EJECTING APPARATUS

(71) Applicant: SEIKO EPSON CORPORATION, Tokyo (JP)

(72) Inventors: Yasuaki Hamada, Chino (JP); Koji Ohashi, Matsumoto (JP); Yoshiki Yano, Chino (JP); Tsukasa Hitomi, Chino (JP); Masao Nakayama, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 116 days.

(21) Appl. No.: 18/936,040

(22) Filed: Nov. 4, 2024

(65) Prior Publication Data

US 2025/0144933 A1 May 8, 2025

(30) Foreign Application Priority Data

Nov. 6, 2023 (JP) ................................ 2023-189228

(51) Int. Cl.
*B41J 2/045* (2006.01)
*B41J 2/14* (2006.01)

(52) U.S. Cl.
CPC ....... *B41J 2/04581* (2013.01); *B41J 2/04588* (2013.01); *B41J 2/14233* (2013.01)

(58) Field of Classification Search
CPC ............... B41J 2/04581; B41J 2/04588; B41J 2/14233; B41J 2002/14362; B41J 2/04551; B41J 2002/14419
See application file for complete search history.

(56) References Cited

U.S. PATENT DOCUMENTS

2013/0169716 A1* 7/2013 Konishi ............... B41J 2/04588 347/70
2022/0258471 A1* 8/2022 Shimosato ........... B41J 2/14274

FOREIGN PATENT DOCUMENTS

EP 3456539 A1 * 3/2019 .......... B41J 2/14233
JP 2022-126445 8/2022

OTHER PUBLICATIONS

English machine translation of Asaoka et al. (EP 3456539 A1) (Year: 2019).*

* cited by examiner

*Primary Examiner* — Ricardo I Magallanes
*Assistant Examiner* — Natasha Dephenia Quinn
(74) *Attorney, Agent, or Firm* — WORKMAN NYDEGGER

(57) ABSTRACT

When the drive frequency of the piezoelectric body at which the liquid is ejected is defined as a first drive frequency, the coercive voltage of the piezoelectric body obtained when the piezoelectric body is driven at the first drive frequency is defined as a first coercive voltage, a drive frequency lower than the first drive frequency is defined as a second drive frequency, and the coercive voltage of the piezoelectric body obtained when the piezoelectric body is driven at the second drive frequency is defined as a second coercive voltage, the difference between the reference voltage and the minimum value of the drive voltage is higher than the first coercive voltage and is lower than the second coercive voltage.

8 Claims, 11 Drawing Sheets

FIG. 12

| | MINIMUM VOLTAGE [V] | AMOUNT OF DISPLACEMENT [nm] |
|---|---|---|
| EXAMPLE 1 | −3.5 | 633 |
| EXAMPLE 2 | −3.0 | 621 |
| EXAMPLE 3 | −2.5 | 612 |
| EXAMPLE 4 | −2.0 | 597 |
| EXAMPLE 5 | −1.5 | 586 |
| EXAMPLE 6 | −1.0 | 572 |
| EXAMPLE 7 | −0.5 | 560 |

LIQUID EJECTING APPARATUS

The present application is based on, and claims priority from JP Application Serial Number 2023-189228, filed Nov. 6, 2023, the disclosure of which is hereby incorporated by reference herein in its entirety.

BACKGROUND

1. Technical Field

The present disclosure relates to a liquid ejecting apparatus.

2. Related Art

A liquid ejecting apparatus including a liquid ejecting head that ejects a liquid such as ink onto a medium such as printing paper has been proposed in the related art. A piezoelectric ink jet printer is known as the liquid ejecting apparatus. In the piezoelectric ink jet printer, a piezoelectric element that vibrates a diaphragm forming part of a wall surface of a pressure chamber is used.

In a liquid ejecting head described in JP-A-2022-126445, the pressure in pressure chambers is changed by applying a drive voltage to piezoelectric elements, and ink droplets are ejected from nozzles disposed opposite the respective pressure chambers. In this liquid ejecting head, the minimum value of the voltage applied to a piezoelectric body is set higher than the coercive voltage.

By setting the minimum value of the voltage applied to the piezoelectric body higher than the coercive voltage, the range of the voltage applied to the piezoelectric body can be set to a range in which polarization reversal is not completed, and therefore the amount of displacement of the piezoelectric element can be made larger.

However, studies by the inventors have proven that the coercive voltage becomes lower in a high frequency band than in a normal frequency band due to rate limiting of the circuit and the like. That is, in the high frequency band, for example, if the voltage applied to the piezoelectric body is set higher than the coercive voltage in the normal frequency band, there is some room for the range of the voltage that can be used because actually the coercive voltage is shifted toward the negative side. An object of the present disclosure is to execute piezoelectric body driving in which displacement characteristics are enhanced as much as possible while the drive frequency is also taken into consideration.

SUMMARY

A liquid ejecting apparatus according to an aspect of the present disclosure is a liquid ejecting apparatus including a liquid ejecting head having a first electrode, a second electrode, and a piezoelectric body disposed between the first electrode and the second electrode and a voltage applying section that drives the piezoelectric body to eject a liquid by applying a reference voltage that does not change with time to the first electrode and applying a drive voltage that changes with time to the second electrode. When the drive frequency of the piezoelectric body at which the liquid is ejected is defined as a first drive frequency, the coercive voltage of the piezoelectric body obtained when the piezoelectric body is driven at the first drive frequency is defined as a first coercive voltage, a drive frequency lower than the first drive frequency is defined as a second drive frequency, and the coercive voltage of the piezoelectric body obtained when the piezoelectric body is driven at the second drive frequency is defined as a second coercive voltage, the difference between the reference voltage and the minimum value of the drive voltage is higher than the first coercive voltage and is lower than the second coercive voltage.

BRIEF DESCRIPTION OF THE DRAWINGS

FIG. 12 is a table illustrating the evaluation results of the amount of displacement of the piezoelectric element.

DESCRIPTION OF EMBODIMENTS

Figure 1:
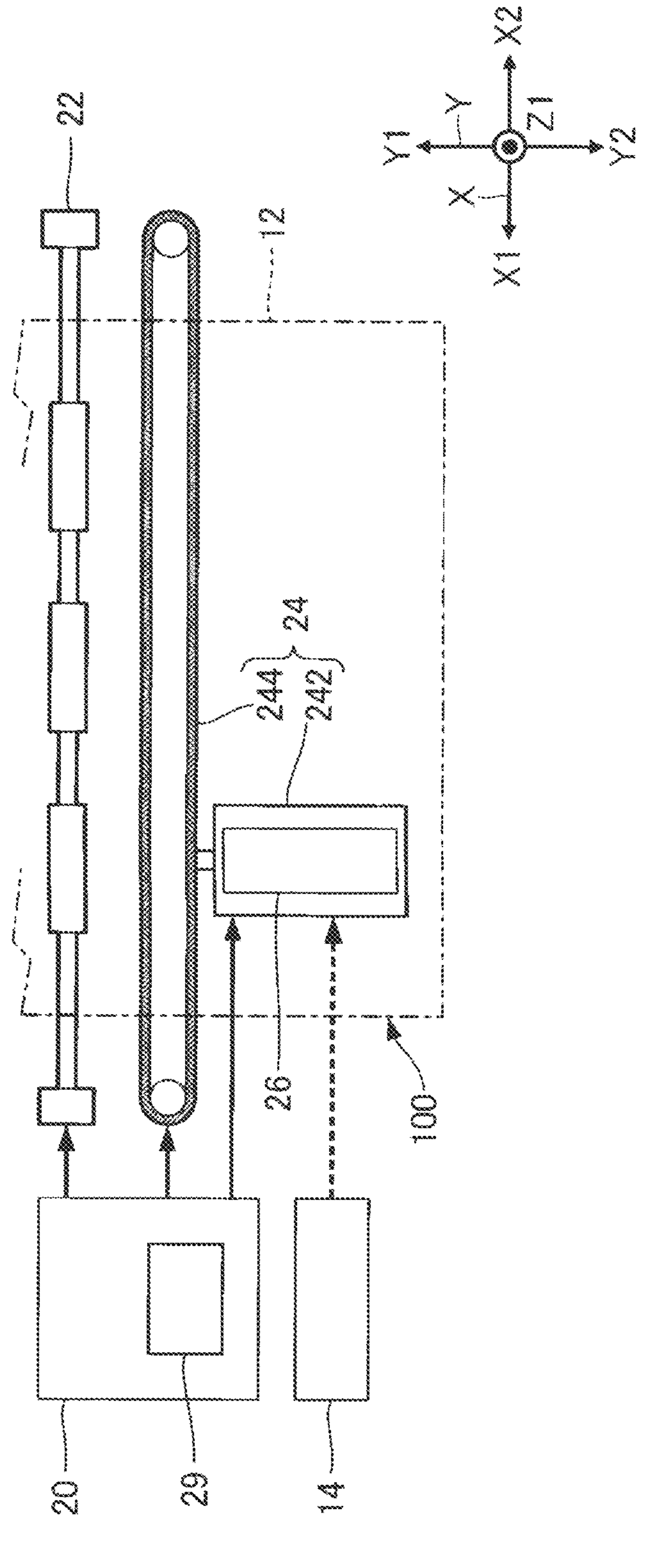
FIG. 1 is a schematic diagram illustrating, by way of example, the configuration of a liquid ejecting apparatus according to the present embodiment.

A preferred embodiment according to the present disclosure will be described below with reference to the accompanying drawings. Note that, in the drawings, the dimensions and scale of the respective portions are different from actual ones as appropriate, and some portions are schematically illustrated for facilitating understanding. Furthermore, the scope of the present disclosure is not limited to these forms as long as there is no particular description regarding limiting the present disclosure in the following description.

The following description will be made using an X-axis, a Y-axis, and a Z-axis intersecting each other as appropriate. One direction along the X-axis will be referred to as an X1 direction, and the opposite direction to the X1 direction will be referred to as an X2 direction. The directions opposite to each other along the Y-axis will be referred to as a Y1 direction and a Y2 direction. The directions opposite to each other along the Z-axis will be referred to as a Z1 direction and a Z2 direction. Viewing in a direction along the Z-axis will be referred to as "plan view." The Z-axis is typically a vertical axis. However, the Z-axis does not need to be a vertical axis. Furthermore, although the X-axis, the Y-axis, and the Z-axis are typically orthogonal to each other, they are not limited thereto, and it is sufficient for them to intersect at an angle within a range of, for example, 80° to 100°.

1. Present Embodiment

1-1. Overall Configuration of Liquid Ejecting Apparatus 100

FIG. 1 is a configuration diagram schematically illustrating a liquid ejecting apparatus 100 according to the present embodiment. The liquid ejecting apparatus 100 is an ink jet printing apparatus that ejects ink, which is one example of a liquid, onto a medium 12 as droplets. The medium 12 is typically printing paper. The medium 12 is not limited to printing paper and may be, for example, a printing target of any material, such as a resin film or fabric.

As illustrated in FIG. 1, a liquid container 14 that stores the ink is mounted on the liquid ejecting apparatus 100. Examples of the specific form of the liquid container 14 include a cartridge attachable to and detachable from the liquid ejecting apparatus 100, a bag-like ink pack formed of a flexible film, and an ink tank that can be refilled with the ink. Any kind of ink may be stored in the liquid container 14.

The liquid ejecting apparatus 100 has a control unit 20, a transport mechanism 22, a movement mechanism 24, and a liquid ejecting head 26. The control unit 20 includes, for example, a processing circuit such as a central processing unit (CPU) or field programmable gate array (FPGA) and a storage circuit such as a semiconductor memory, and controls operation of each element of the liquid ejecting apparatus 100. The control unit 20 includes a voltage applying section 29 that causes the ink to be ejected from nozzles by controlling driving of piezoelectric elements 44 to be described later.

The transport mechanism 22 transports the medium 12 in the Y2 direction under control by the control unit 20. The movement mechanism 24 reciprocates the liquid ejecting head 26 in the X1 and X2 directions under control by the control unit 20. In the example illustrated in FIG. 1, the movement mechanism 24 has a substantially box-shaped transport body 242 that houses the liquid ejecting head 26 and that is called a carriage and a transport belt 244 to which the transport body 242 is fixed. The number of liquid ejecting heads 26 mounted on the transport body 242 is not limited to one, and a plurality of liquid ejecting heads 26 may be mounted. Furthermore, besides the liquid ejecting head 26, the liquid container 14 may be mounted on the transport body 242.

The liquid ejecting head 26 ejects the ink supplied from the liquid container 14 from each of a plurality of nozzles onto the medium 12 in the Z2 direction under control by the control unit 20. This ejection is executed concurrently with the transport of the medium 12 by the transport mechanism 22 and the reciprocation of the liquid ejecting head 26 by the movement mechanism 24. Thus, an image is formed by the ink on a surface of the medium 12.

1-2. Overall Configuration of Liquid Ejecting Head

Figure 2:
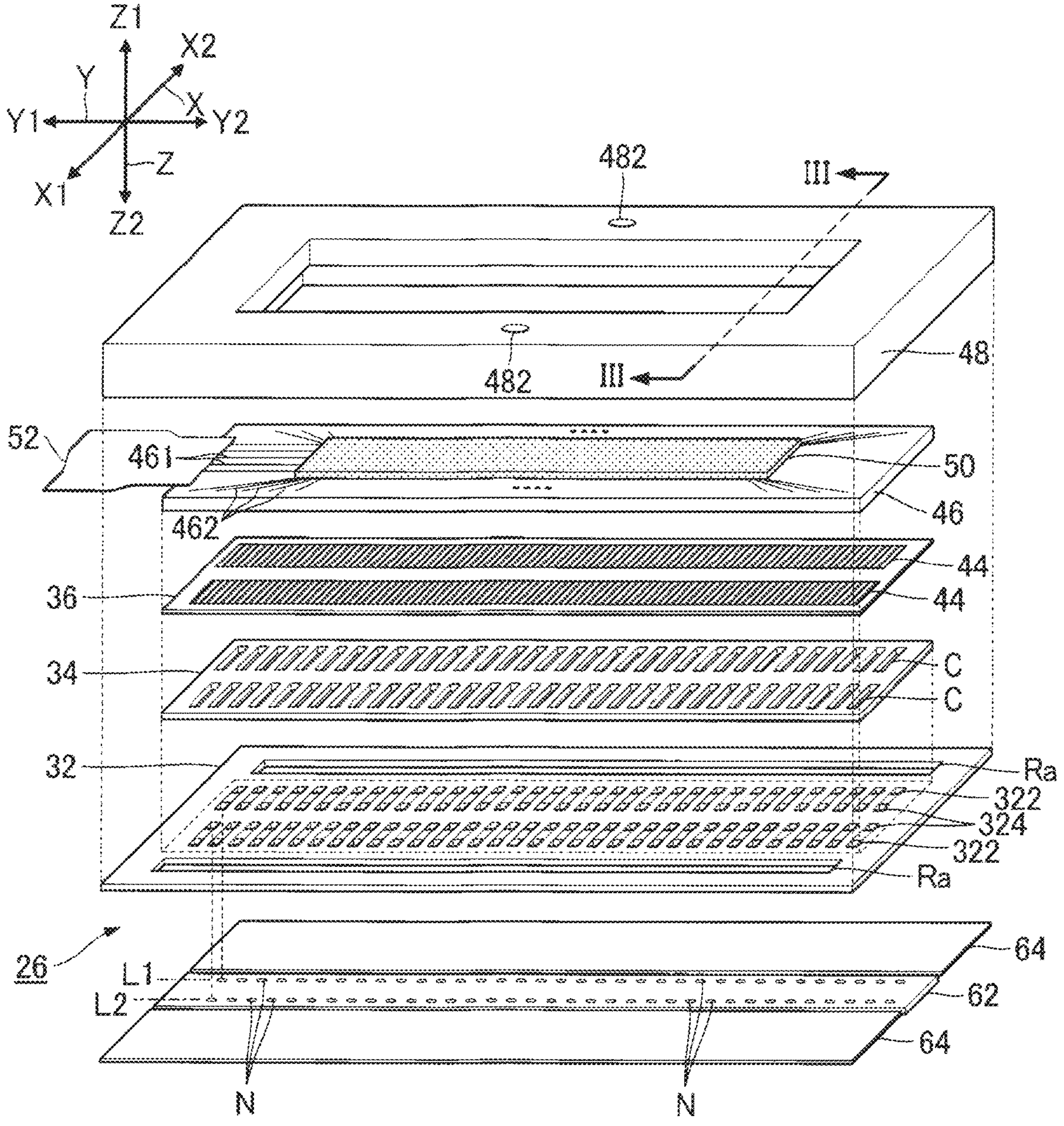
FIG. 2 is an exploded perspective view of a liquid ejecting head illustrated in FIG. 1.
Figure 3:
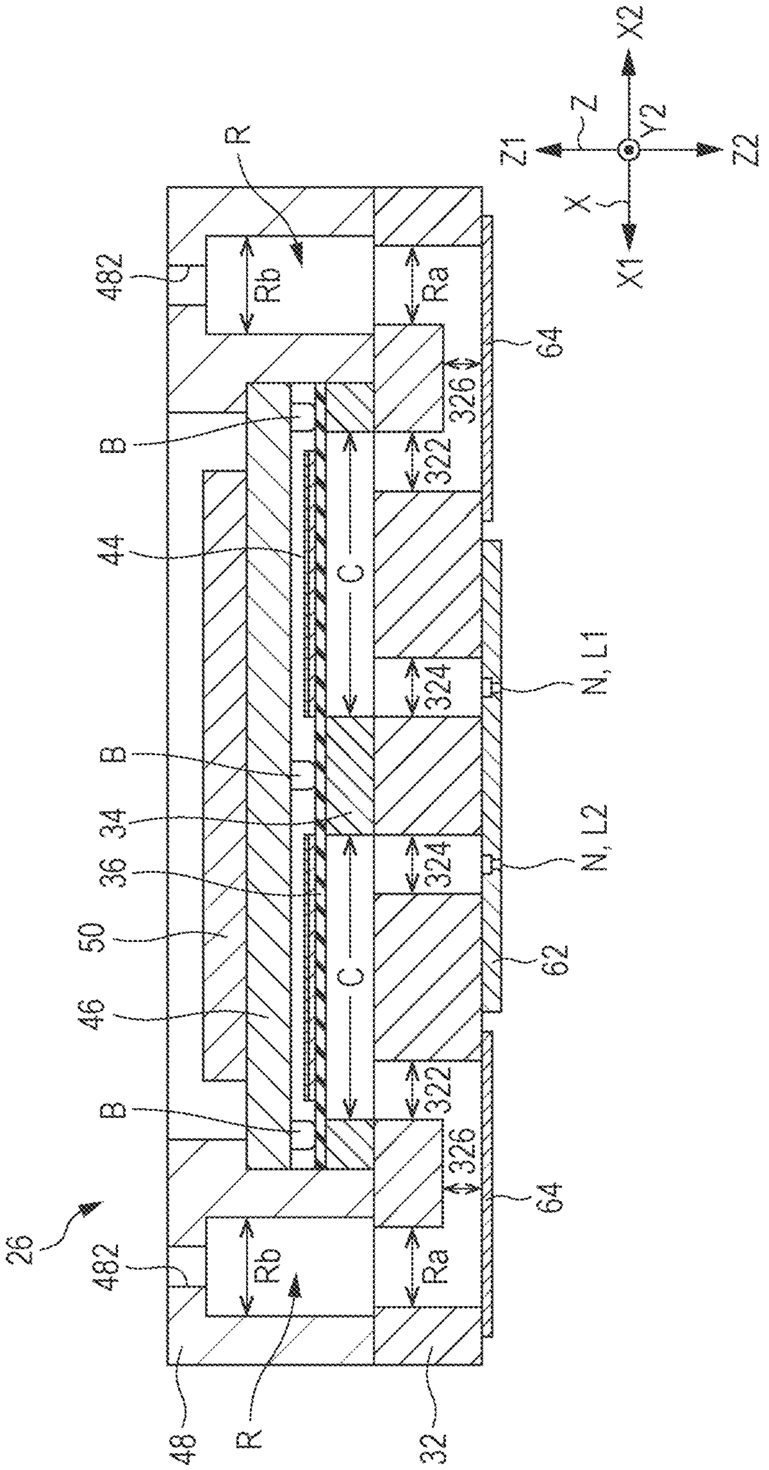
FIG. 3 is a sectional view of part of the liquid ejecting head illustrated in FIG. 2.

FIG. 2 is an exploded perspective view of the liquid ejecting head 26 illustrated in FIG. 1. FIG. 3 is a sectional view of part of the liquid ejecting head illustrated in FIG. 2, and is a sectional view along line III-III in FIG. 2. As illustrated in FIG. 2, the liquid ejecting head 26 has a plurality of nozzles N arranged in the direction along the Y-axis. In the example illustrated in FIG. 2, the plurality of nozzles N are divided into a first row L1 and a second row L2 arranged at an interval from each other in the direction along the X-axis. Each of the first row L1 and the second row L2 is a collection of the plurality of nozzles N linearly arranged in the direction along the Y-axis. Elements relating to the nozzles N of the first row L1 and elements relating to the nozzles N of the second row L2 in the liquid ejecting head 26 are substantially symmetric with each other in the direction along the X-axis. In the following description, elements corresponding to the first row L1 will be mainly described, and a description of elements corresponding to the second row L2 is omitted as appropriate.

The positions of the plurality of nozzles N in the first row L1 in the direction along the Y-axis may be either the same as or different from those of the plurality of nozzles N in the second row L2. Moreover, elements relating to the nozzles N of one of the first row L1 and the second row L2 may be omitted.

As illustrated in FIGS. 2 and 3, the liquid ejecting head 26 has a nozzle plate 62, vibration absorbers 64, a flow path substrate 32, a pressure chamber substrate 34, a diaphragm 36, a wiring substrate 46, a casing portion 48, and a drive circuit 50. Each of the nozzle plate 62, the vibration absorbers 64, the flow path substrate 32, the pressure chamber substrate 34, the diaphragm 36, the wiring substrate 46, and the casing portion 48 is a plate-shaped member elongated in the direction along the Y-axis. The nozzle plate 62, the flow path substrate 32, the pressure chamber substrate 34, the diaphragm 36, and the wiring substrate 46 are arranged in that order in the Z1 direction.

The nozzle plate 62 is a plate-shaped member in which the plurality of nozzles N are formed. Each of the plurality of nozzles N is a circular through-hole that allows the ink to pass therethrough. The nozzles N eject the ink by vibrations of the diaphragm 36. The nozzle plate 62 is joined to the flow path substrate 32, for example, with an adhesive.

Flow paths for supplying the ink to the plurality of nozzles N are formed in the flow path substrate 32. Specifically, in the flow path substrate 32, spaces Ra, a plurality of supply flow paths 322, a plurality of communication flow paths 324, and supply liquid chambers 326 are formed. The spaces Ra are elongated openings extending in the direction along the Y-axis as viewed in plan view in the direction along the Z-axis. The supply flow paths 322 and the communication flow paths 324 are through-holes formed for the individual nozzles N. The supply liquid chambers 326 are elongated spaces extending in the direction along the Y-axis beside the plurality of nozzles N, and the spaces Ra and the plurality of supply flow paths 322 communicate with each other through the supply liquid chambers 326. Each of the plurality of communication flow paths 324 overlaps with one nozzle N corresponding to the communication flow path 324 in plan view. The pressure chamber substrate 34 is joined to the flow path substrate 32, for example, with an adhesive.

A plurality of pressure chambers C are formed in the pressure chamber substrate 34. The plurality of pressure chambers C are arranged in the direction along the Y-axis. The pressure chambers C are elongated spaces that are formed for the individual nozzles N and that extend in the direction along the X-axis in plan view. The pressure chambers C are spaces located between the flow path substrate 32 and the diaphragm 36. The pressure chambers C communicate with the nozzles N through the communication flow paths 324 and communicate with the spaces Ra through the supply flow paths 322 and the supply liquid chambers 326.

Each of the nozzle plate 62, the flow path substrate 32, and the pressure chamber substrate 34 is manufactured by, for example, processing a single-crystal silicon substrate by using dry etching, wet etching, or the like. However, other publicly known methods may be used as appropriate for the manufacture of the nozzle plate 62, the flow path substrate 32, and the pressure chamber substrate 34.

The diaphragm 36 is disposed on the surface of the pressure chamber substrate 34 facing the Z1 direction. The diaphragm 36 is a plate-shaped member that can elastically vibrate.

A plurality of piezoelectric elements 44 corresponding to the nozzles N are disposed on the surface of the diaphragm 36 facing the Z1 direction. Each piezoelectric element 44 forms an elongated shape extending in the direction along the X-axis in plan view. The plurality of piezoelectric elements 44 correspond to the plurality of pressure chambers C and are arranged in the direction along the Y-axis. The piezoelectric elements 44 become deformed upon application of a voltage thereto. When the diaphragm 36 vibrates in association with this deformation, the ink is ejected from the nozzles N due to variations in the pressure in the pressure chambers C.

The casing portion 48 is a case for storing the ink to be supplied to the plurality of pressure chambers C. As illustrated in FIG. 3, spaces Rb are formed in the casing portion 48. The spaces Rb in the casing portion 48 and the spaces Ra in the flow path substrate 32 communicate with each other. The spaces formed by the spaces Ra and the spaces Rb function as liquid storing chambers R that are reservoirs that store the ink to be supplied to the plurality of pressure chambers C. The ink is supplied to the liquid storing chambers R through inlets 482 formed in the casing portion 48. The ink in the liquid storing chambers R is supplied to the pressure chambers C through the supply liquid chambers 326 and the supply flow paths 322.

The vibration absorbers 64 are flexible films forming wall surfaces of the liquid storing chambers R. The vibration absorbers 64 are compliant substrates that absorb pressure variations of the ink in the liquid storing chambers R.

The wiring substrate 46 is a plate-shaped member on which wiring lines for electrically connecting the drive circuit 50 to the plurality of piezoelectric elements 44 are formed. The surface of the wiring substrate 46 facing the Z2 direction is joined to the diaphragm 36 with a plurality of electrically conductive bumps B interposed therebetween. Meanwhile, the drive circuit 50 is mounted on the surface of the wiring substrate 46 facing the Z1 direction. The drive circuit 50 is an integrated circuit (IC) chip that outputs a drive voltage Com and a reference voltage E0 for driving each piezoelectric element 44. The wiring substrate 46 is not limited to a rigid substrate and may be, for example, a flexible printed circuit (FPC) or a flexible flat cable (FFC). In this case, the drive circuit 50 may be mounted on the wiring substrate 46, or the wiring substrate 46 may also function as an external wiring line 52.

As illustrated in FIG. 2, an end portion of the external wiring line 52 is joined to the surface of the wiring substrate 46 facing the Z1 direction. The external wiring line 52 is composed of, for example, a connecting component such as a flexible printed circuit (FPC) or a flexible flat cable (FFC). The wiring substrate 46 has formed thereon a plurality of wiring lines 461 that electrically connect the external wiring line 52 to the drive circuit 50 and a plurality of wiring lines 462 to which the drive voltage Com and the reference voltage E0 output from the drive circuit 50 are supplied.

1-3. Diaphragm 36 and Piezoelectric Elements 44

Figure 4:
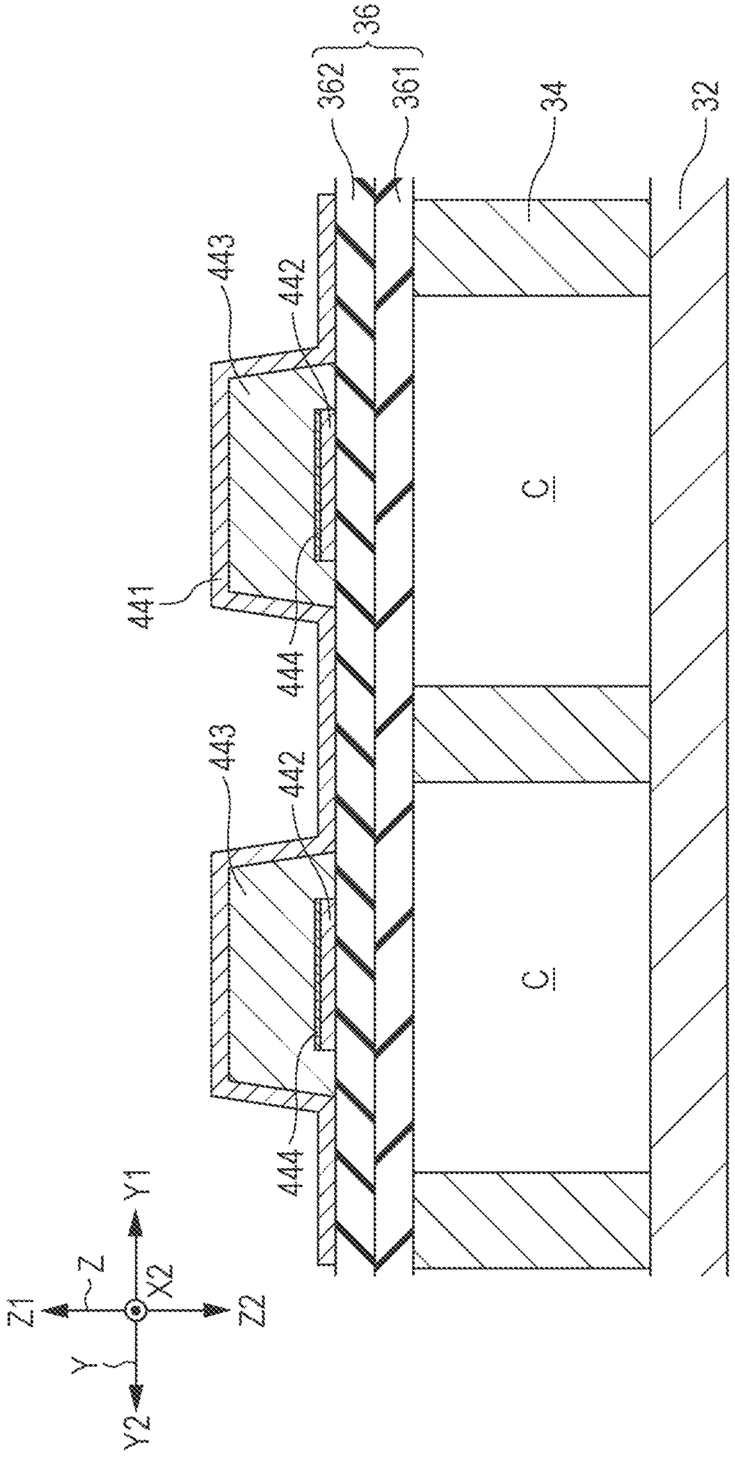
FIG. 4 is an enlarged sectional view of part of the liquid ejecting head illustrated in FIG. 3.

FIG. 4 is an enlarged sectional view of part of the liquid ejecting head 26 illustrated in FIG. 3. The diaphragm 36 illustrated in FIG. 4 vibrates in response to driving of piezoelectric bodies 443 of the piezoelectric elements 44 to be described later. The diaphragm 36 has a first layer 361 and a second layer 362. The first layer 361 and the second layer 362 are stacked in that order in the Z1 direction.

The first layer 361 is, for example, an elastic film composed of silicon oxide ($SiO_2$). This elastic film is formed by, for example, thermally oxidizing one surface of a single-crystal silicon substrate. The second layer 362 is, for example, an insulating film composed of zirconium oxide ($ZrO_2$). This insulating film is formed by, for example, forming a layer of zirconium by sputtering and thermally oxidizing this layer. The zirconium oxide has excellent electrical insulation, mechanical strength, and toughness. Thus, the inclusion of the second layer 362 containing the zirconium oxide in the diaphragm 36 can enhance properties of the diaphragm 36.

Another layer of a metal oxide or the like may be interposed between the first layer 361 and the second layer 362. Part or the whole of the diaphragm 36 may be formed integrally with the pressure chamber substrate 34. The diaphragm 36 may be formed of a layer of a single material.

The pressure chambers C in the pressure chamber substrate 34 can be formed by, for example, anisotropically etching a single-crystal silicon substrate. Although not illustrated, the shape of the pressure chambers C in plan view is rectangular. However, the planar shape of the pressure chambers C is not limited thereto and may be any shape. For example, the shape of the pressure chambers C in plan view is a parallelogram when the pressure chambers C are formed by anisotropic etching of a (110)-oriented single-crystal silicon substrate.

The piezoelectric elements 44 overlap with the pressure chambers C in plan view. The piezoelectric elements 44 each have a second electrode 442, a seed layer 444, the piezoelectric body 443, and a first electrode 441, and they are stacked in that order in the Z1 direction. Another layer such as a layer for enhancing adhesion may be interposed as appropriate between the layers in the piezoelectric elements 44 or between the piezoelectric elements 44 and the diaphragm 36.

The second electrodes 442 are individual electrodes disposed separately from each other for the individual piezoelectric elements 44. Specifically, a plurality of second electrodes 442 extending in the direction along the X-axis are arranged in the direction along the Y-axis at an interval from each other. The drive voltage Com for ejecting the ink from the nozzle N is applied to the second electrode 442 of each piezoelectric element 44.

Examples of the material of the second electrodes 442 include metal materials such as aluminum (Al), nickel (Ni), gold (Au), and copper (Cu) or alloys. The second electrodes 442 may each be either a single layer or a plurality of layers. For example, the second electrodes 442 each have a first layer composed of titanium (Ti), a second layer composed of platinum (Pt), and a third layer composed of iridium (Ir), and they are stacked in that order in the Z1 direction. Furthermore, the second electrodes 442 are formed by, for example, a publicly known film deposition technique such as sputtering and a publicly known processing technique such as photolithography and etching.

The first electrode 441 is a strip-shaped common electrode extending in the direction along the Y-axis continuously across the plurality of piezoelectric elements 44. The reference voltage E0 is applied to the first electrode 441.

Examples of the material of the first electrode 441 include metal materials such as aluminum (Al), nickel (Ni), gold (Au), and copper (Cu) or alloys. The first electrode 441 may be either a single layer or a plurality of layers. For example, the first electrode 441 has a layer composed of iridium, a layer composed of iridium oxide ($IrO_x$), a layer composed of titanium oxide ($TiO_x$), and a layer composed of iridium, and they are stacked in that order from the piezoelectric body 443. The first electrode 441 is formed by, for example, a publicly known film deposition technique such as sputtering and a publicly known processing technique such as photolithography and etching.

The piezoelectric body 443 is disposed between the first electrode 441 and the second electrode 442. For example, the piezoelectric body 443 has a strip shape extending along the Y-axis and is separated for each piezoelectric element 44 by formation of a plurality of cutouts. The piezoelectric bodies 443 may be individually disposed for the plurality of piezoelectric elements 44.

The piezoelectric body 443 is composed of a piezoelectric material having a perovskite crystal structure represented by a general composition formula $ABO_3$. Examples of the piezoelectric material include lead titanate ($PbTiO_3$), lead zirconate titanate (PZT: $Pb(Zr,Ti)O_3$), lead zirconate ($PbZrO_3$), lead lanthanum titanate ($(Pb,La)TiO_3$), lead lanthanum zirconate titanate ($(Pb,La)(Zr,Ti)O_3$), lead zirconate titanate niobate ($Pb(Zr,Ti,Nb)O_3$), lead zirconate titanate magnesium niobate ($Pb(Zr,Ti)(Mg,Nb)O_3$), and potassium sodium niobate (KNN). Among them, lead zirconate titanate (PZT) is preferably used as the constituent material of the piezoelectric body 443. The piezoelectric body 443 may contain small amounts of other elements such as impurities.

For example, the piezoelectric body 443 is formed by forming a precursor layer of the piezoelectric body 443 by a sol-gel method or a metal organic decomposition (MOD) method and baking the precursor layer to crystallize it. The piezoelectric body 443 may be either a single layer or a plurality of layers.

The seed layer 444 is disposed between the second electrode 442 and the piezoelectric body 443. The seed layer 444 is disposed in the same region and with the same shape as the second electrode 442 in plan view. It is sufficient for the seed layer 444 to be disposed between the second electrode 442 and the piezoelectric body 443. For example, the seed layer 444 may be disposed in the same region and with the same shape as the piezoelectric body 443 in plan view.

The seed layer 444 has a function of improving the orientation properties of the piezoelectric body 443 when the piezoelectric body 443 is formed. Specifically, the seed layer 444 is composed of, for example, titanium (Ti). In the case in which the seed layer 444 is composed of titanium, island-like Ti serves as crystal nuclei to improve the orientation properties of the piezoelectric body 443 when the piezoelectric body 443 is formed. The seed layer 444 containing titanium is formed by, for example, a publicly known film deposition technique such as sputtering and a publicly known processing technique such as photolithography and etching. The seed layer 444 may be regarded as part of the second electrode 442.

The seed layer 444 is not limited to one composed of titanium. For example, the seed layer 444 may be composed of a composite oxide having a perovskite structure containing lead, iron, and titanium as constituent elements. In this case, when the piezoelectric body 443 is formed, the piezoelectric body 443 is affected by the crystal structure of the seed layer 444. This improves the orientation properties of the piezoelectric body 443. For example, the composite oxide is a solid solution of $BiFeO_3$ and $PbTiO_3$ and is represented as $(Bi,Pb)(Fe,Ti)O_3$. The seed layer 444 composed of such a composite oxide is formed by, for example, forming a precursor layer of the composite oxide by a sol-gel method or an MOD method and baking the precursor layer to crystallize it. Note that the seed layer 444 may be omitted.

In each of the above piezoelectric elements 44, the piezoelectric body 443 becomes deformed depending on the voltage applied between the first electrode 441 and the second electrode 442. The drive voltage Com depending on the amount of ink ejected is applied to the second electrode 442. The reference voltage E0 that is constant irrespective of the amount of ink ejected is applied to the first electrode 441. The piezoelectric body 443 becomes deformed when a voltage difference occurs between the first electrode 441 and the second electrode 442 due to the application of the drive voltage Com and the reference voltage E0.

1-4. Drive Voltage Com, Reference Voltage E0, and Applied Voltage Ea

Figure 5:
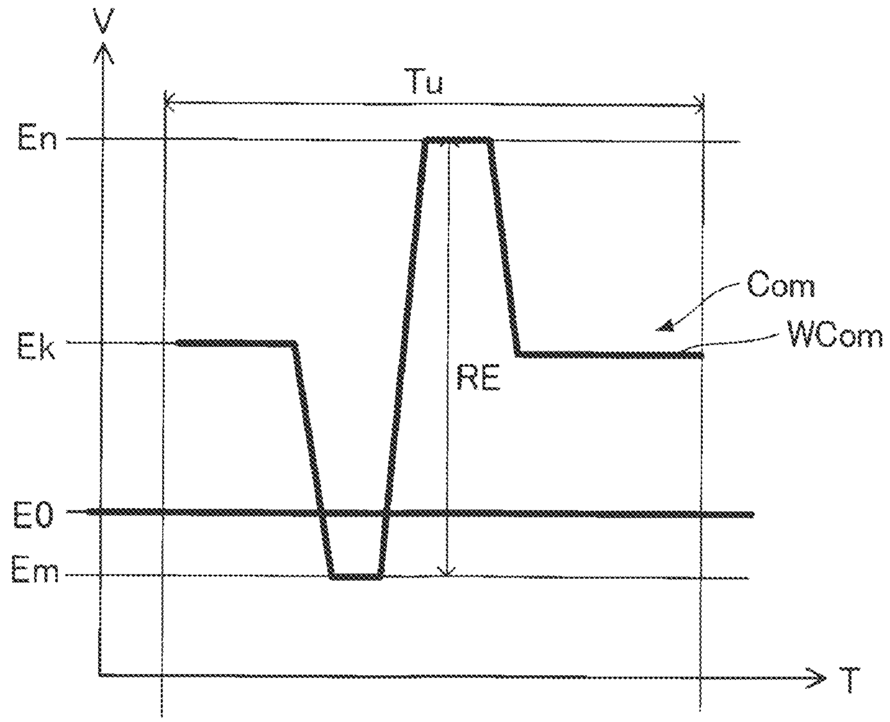
FIG. 5 is a graph for explaining a drive voltage and a reference voltage.

FIG. 5 is a graph for explaining the drive voltage Com and the reference voltage E0. The horizontal axis illustrated in FIG. 5 indicates time, and the vertical axis indicates voltage [V].

The drive voltage Com changes with time. The drive voltage Com includes a drive waveform WCom. The drive waveform WCom is repeated every unit period Tu. The drive waveform WCom includes an intermediate voltage Ek, a maximum voltage En, and a minimum voltage Em. The maximum voltage En is the maximum value of the drive voltage Com. The minimum voltage Em is the minimum value of the drive voltage Com. In the drive waveform WCom, the voltage drops from the intermediate voltage Ek to the minimum voltage Em, and the minimum voltage Em is kept. Then, the voltage rises from the minimum voltage Em to the maximum voltage En, and the maximum voltage En is kept. Then, the voltage drops to the intermediate voltage Ek. The drive waveform WCom illustrated in FIG. 5 is one example, and the drive voltage Com may have another waveform.

The reference voltage E0 does not change with time and is constant. In the illustrated example, the reference voltage E0 has a higher voltage value than the minimum voltage Em of the drive voltage Com. However, the reference voltage E0 is not limited thereto.

As described above, the piezoelectric body 443 is disposed between the first electrode 441 and the second electrode 442. The piezoelectric body 443 is driven by the voltage difference between the reference voltage E0 applied to the first electrode 441 and the drive voltage Com applied to the second electrode 442. An applied voltage Ea that is the difference between the reference voltage E0 and the drive voltage Com is supplied to the piezoelectric body 443.

Figure 6:
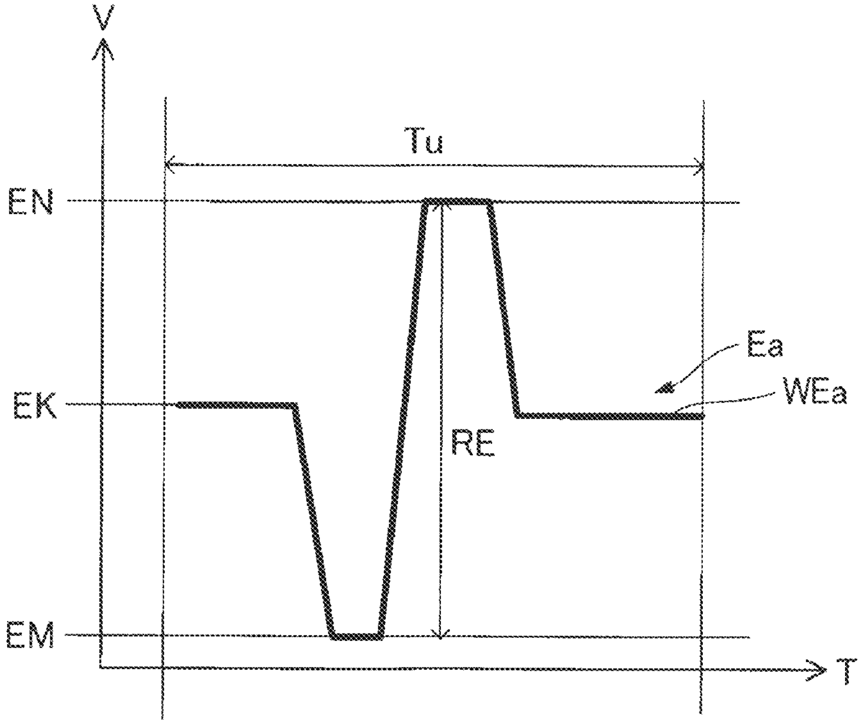
FIG. 6 illustrates, by way of example, an applied voltage to a piezoelectric body.

FIG. 6 illustrates, by way of example, the applied voltage Ea that is the voltage actually applied to the piezoelectric body 443 when the drive voltage Com illustrated in FIG. 5 is applied to the first electrode 441 and the reference voltage E0 is applied to the second electrode 442. That is, the applied voltage Ea illustrated in FIG. 6 is obtained by subtracting the reference voltage E0 from the drive voltage Com illustrated in FIG. 5 at each time.

The horizontal axis illustrated in FIG. 6 indicates time, and the vertical axis indicates voltage [V]. The applied voltage Ea includes a waveform WEa. The waveform WEa includes an intermediate voltage EK, a maximum voltage EN, and a minimum voltage EM. The maximum voltage EN is the difference between the maximum voltage En of the drive voltage Com and the reference voltage E0. The minimum voltage EM is the difference between the minimum voltage Em of the drive voltage Com and the reference voltage E0. The waveform WEa illustrated in FIG. 6 is one example and changes depending on the drive voltage Com and the reference voltage E0.

Because the reference voltage E0 is constant, a voltage range RE of the applied voltage Ea is equal to the voltage range RE of the drive voltage Com.

As described above, the piezoelectric body 443 becomes deformed depending on the voltage applied between the first electrode 441 and the second electrode 442. First, the voltage is lowered from the intermediate voltage EK to the minimum voltage EM; that is, discharging is executed. This causes the piezoelectric element 44 and the diaphragm 36 to become deformed so as to bend in the Z1 direction. As a result, the ink is taken into the pressure chamber C. Subsequently, the voltage is raised from the minimum voltage EM to the maximum voltage EN; that is, charging is executed. This causes the piezoelectric element 44 and the diaphragm 36 to become deformed so as to bend in the Z2 direction. As a result, the ink in the pressure chamber C is ejected from the nozzle.

1-5. Characteristics of Piezoelectric Body 443

Figure 7:
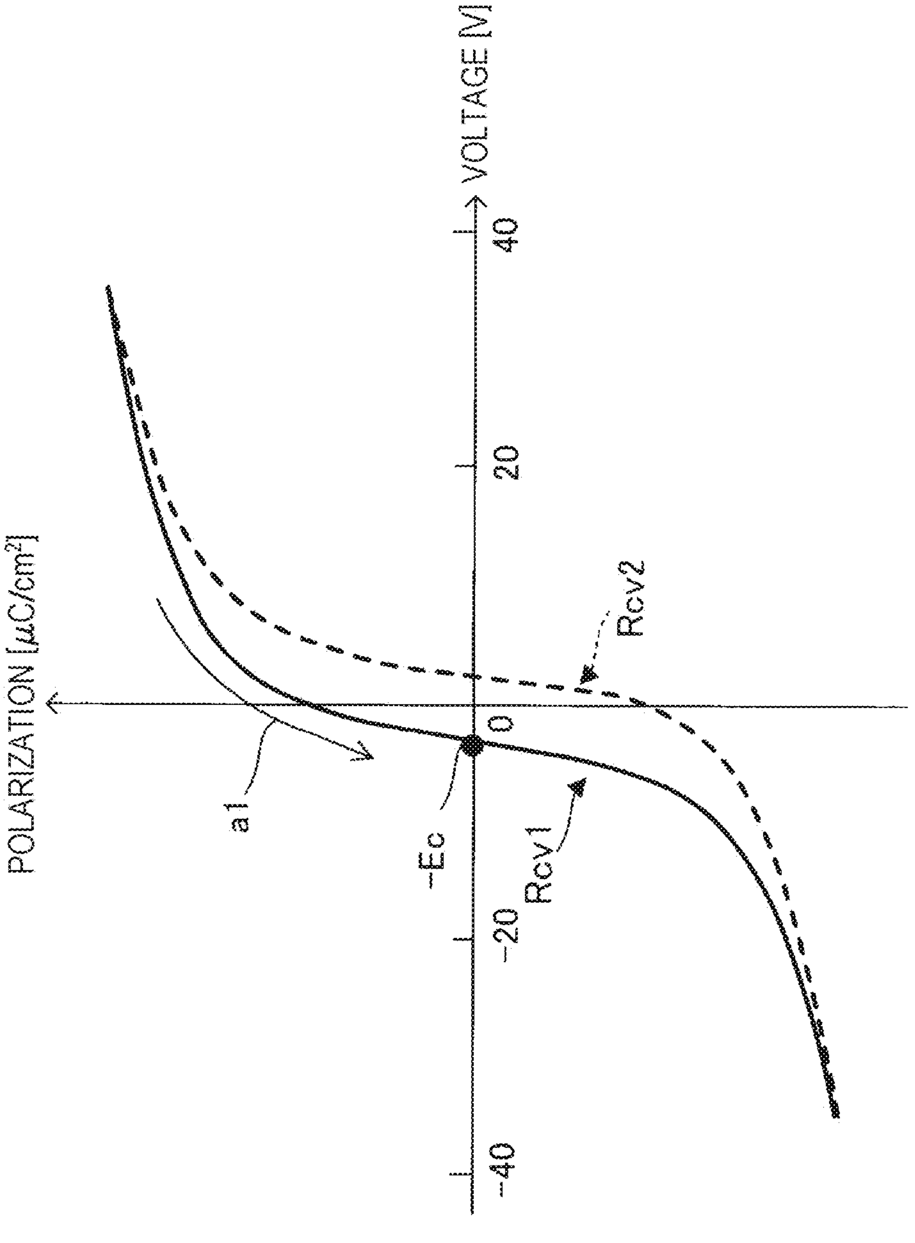
FIG. 7 illustrates, by way of example, a hysteresis curve indicating the relationship between the voltage and the polarization of the piezoelectric body.
Figure 8:
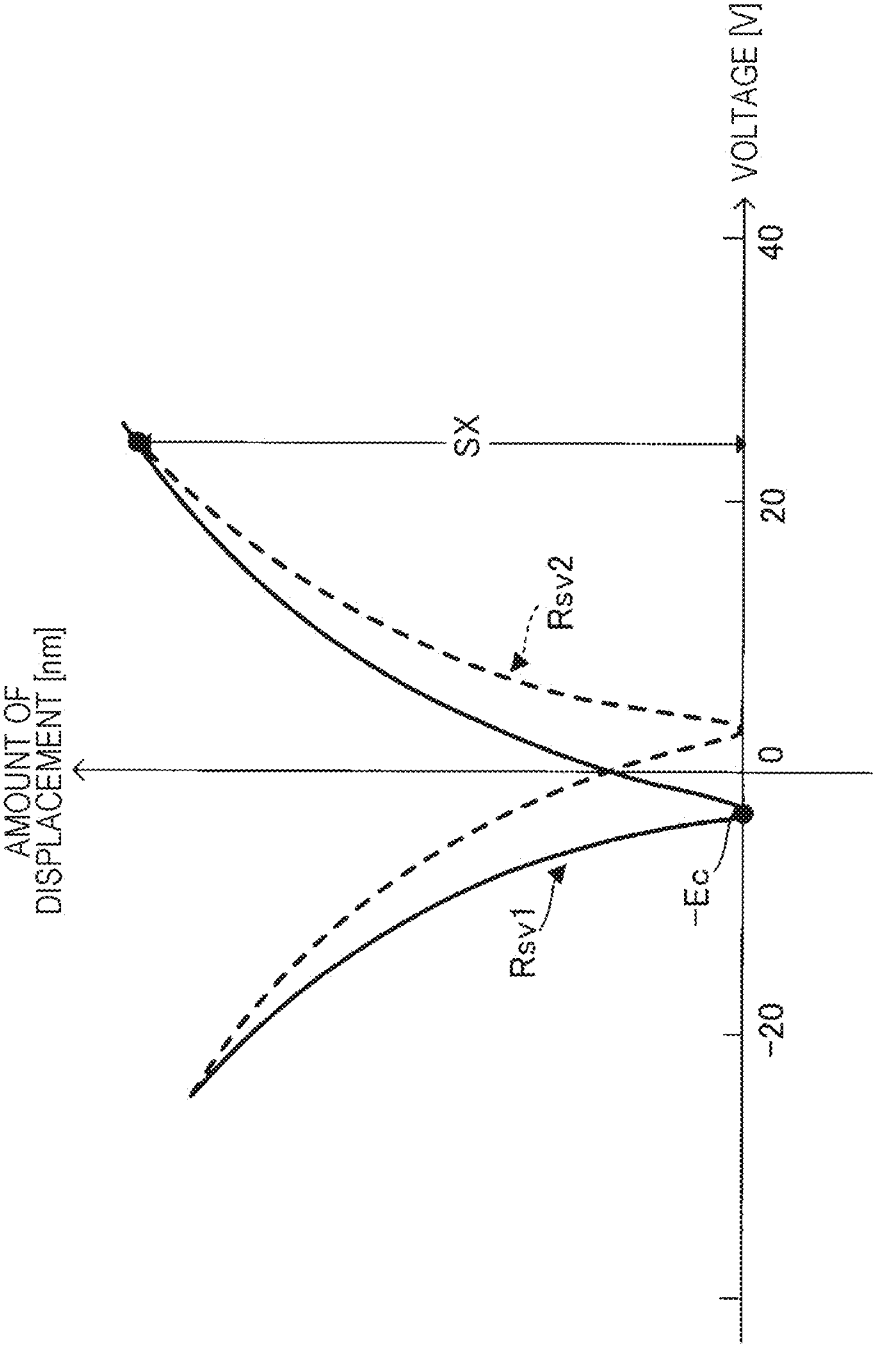
FIG. 8 illustrates, by way of example, a butterfly curve of the piezoelectric body.

FIG. 7 illustrates, by way of example, a hysteresis curve indicating the relationship between the voltage and the polarization of the piezoelectric body 443. FIG. 8 illustrates, by way of example, a butterfly curve of the piezoelectric body 443. In FIG. 7, the horizontal axis indicates voltage [V], and the vertical axis indicates polarization [$\mu C/cm^2$]. In FIG. 8, the horizontal axis indicates voltage [V], and the vertical axis indicates the amount of displacement [nm] of the diaphragm 36. The vertical axis can also be regarded as the amount of distortion of the piezoelectric body 443. The amount of displacement of the diaphragm 36 indicates how far the diaphragm 36 is displaced toward the Z2 side, i.e., toward the pressure chamber C, from the position of the diaphragm 36 displaced farthest toward the Z1 side, i.e., toward the opposite side from the pressure chamber C, with this position being defined as 0. That is, the amount of displacement of the diaphragm 36 indicates the relative position with respect to the position of the diaphragm 36 displaced farthest toward the Z1 side.

In the period of the change from the intermediate voltage EK to the minimum voltage EM in FIG. 6, the voltage decreases toward a coercive voltage −Ec that is the voltage at the coercive field along a route Rcv1 on the hysteresis curve illustrated in FIG. 7, and the polarization changes toward the negative side. That is, a change occurs as illustrated by an arrow al. At this time, in the butterfly curve illustrated in FIG. 8, the amount of displacement changes toward the negative side along a route Rsv1. Then, when the voltage becomes the coercive voltage −Ec, the diaphragm 36 is displaced farthest toward the Z1 side, and the amount of displacement of the diaphragm 36 becomes 0. The coercive field is the magnitude of the electric field at a polarization of 0 $\mu C/cm^2$.

Next, in the period of the change from the minimum voltage EM to the maximum voltage EN in FIG. 6, a transition occurs from the route Rcv1 on the hysteresis curve illustrated in FIG. 7 to a route Rcv2, and the polarization changes toward the positive side by the amount corresponding to the voltage range RE. At this time, in the butterfly curve illustrated in FIG. 8, a transition occurs from the route Rsv1 to a route Rsv2, and the amount of displacement of the diaphragm 36 changes toward the positive side. Then, the amount of displacement of the diaphragm 36 becomes the amount of displacement corresponding to the maximum voltage EN. In this period, the ink is ejected in association with the displacement of the diaphragm 36 toward the Z2 side.

Here, by setting the minimum voltage EM equal to or higher than the coercive voltage −Ec, the voltage range RE of the voltage applied to the piezoelectric body 443 can be set in a range in which polarization reversal is not completed. Thus, the amount of displacement of the piezoelectric element 44 and the diaphragm 36 can be made large. In particular, the amount of displacement can be maximized by setting the minimum voltage EM to the coercive voltage −Ec. For example, as illustrated in FIG. 8, an amount of displacement SX can be made large by setting the minimum voltage EM to the coercive voltage −Ec. The coercive voltage −Ec is the voltage of the minimum value in the range in which polarization reversal does not occur. Therefore, the amount of displacement SX can be made large by setting the coercive voltage −Ec as the minimum voltage EM.

Therefore, it is preferable that the minimum voltage EM be set to the coercive voltage −Ec in order to obtain a large amount of displacement. However, studies by the inventors have proven that the coercive voltage −Ec becomes lower in a high frequency band than in a normal frequency band due to rate limiting of the circuit and the like. That is, it has been proven that the coercive voltage −Ec has frequency dependence. This coercive voltage −Ec is the coercive voltage −Ec in measurement and is different from the coercive voltage as a physical property value of the piezoelectric body 443 defined from the coercive field of the piezoelectric material and the film thickness of the piezoelectric body 443. Hereinafter, a description will be made with discrimination between "the coercive voltage as the physical property value" and "the coercive voltage −Ec in measurement." Furthermore, studies by the inventors have proven that the coercive voltage −Ec in measurement in the normal frequency band is close to the coercive voltage as the physical property value.

Figure 9:
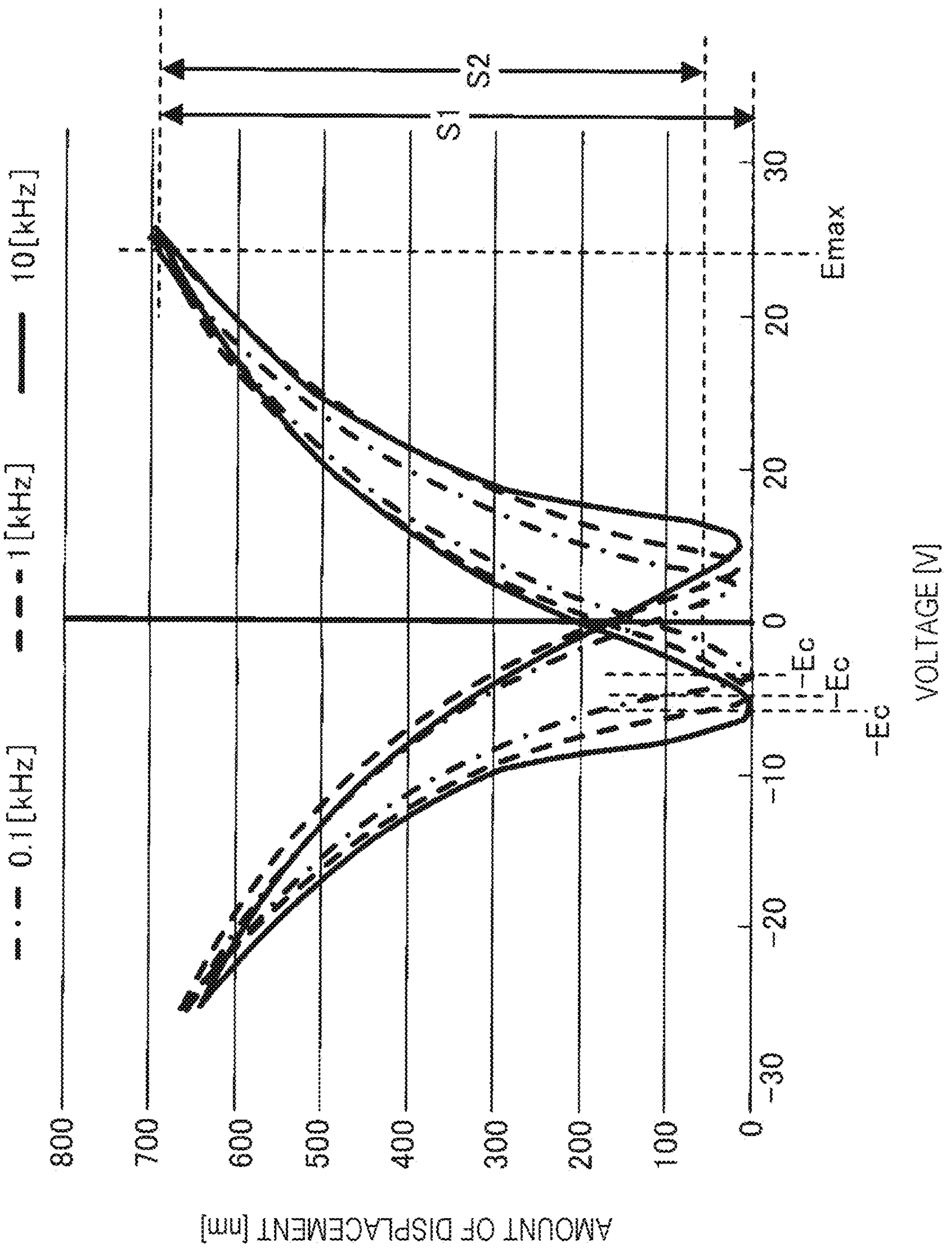
FIG. 9 illustrates, by way of example, hysteresis curves of the piezoelectric body at various drive frequencies.

FIG. 9 illustrates, by way of example, hysteresis curves of the piezoelectric body 443 at various drive frequencies. FIG. 9 illustrates hysteresis curves of the piezoelectric body 443 at 0.1 [kHz], 1 [kHz], and 10 [kHz].

As illustrated in FIG. 9, when the drive frequency changes, the hysteresis curve is displaced and the coercive voltage −Ec as the measurement value is displaced. The coercive voltage −Ec as the measurement value is displaced farther toward the negative side as the drive frequency becomes higher. Note that a ferroelectric characteristics evaluation system FCE-1S made by TOYO Corporation was used in the hysteresis measurement. The hysteresis curves illustrated in FIG. 9 were obtained by applying a triangular wave pulse in a voltage range of 25 [V] to the piezoelectric element 44 and observing the polarization as a response thereto.

For example, the maximum usable value of the maximum voltage EN is defined as Emax. In this case, at a normal drive frequency of 0.1 [kHz], the amount of displacement can be made large as indicated by S1 by employing the coercive voltage −Ec as the minimum voltage EM and setting the maximum voltage EN to Emax. However, if the coercive voltage −Ec at 0.1 [kHz] is set as the minimum voltage EM at a high drive frequency of 1 [kHz], the amount of displacement becomes smaller as indicated by S2. In a high frequency band, the minimum voltage EM needs to be set in consideration of the displacement of the coercive voltage −Ec in measurement. At 1 [kHz], the large amount of displacement indicated by S1 can be obtained by employing the coercive voltage −Ec in measurement at 1 [kHz] as the minimum voltage EM and setting the maximum voltage EN to Emax.

Figure 10:
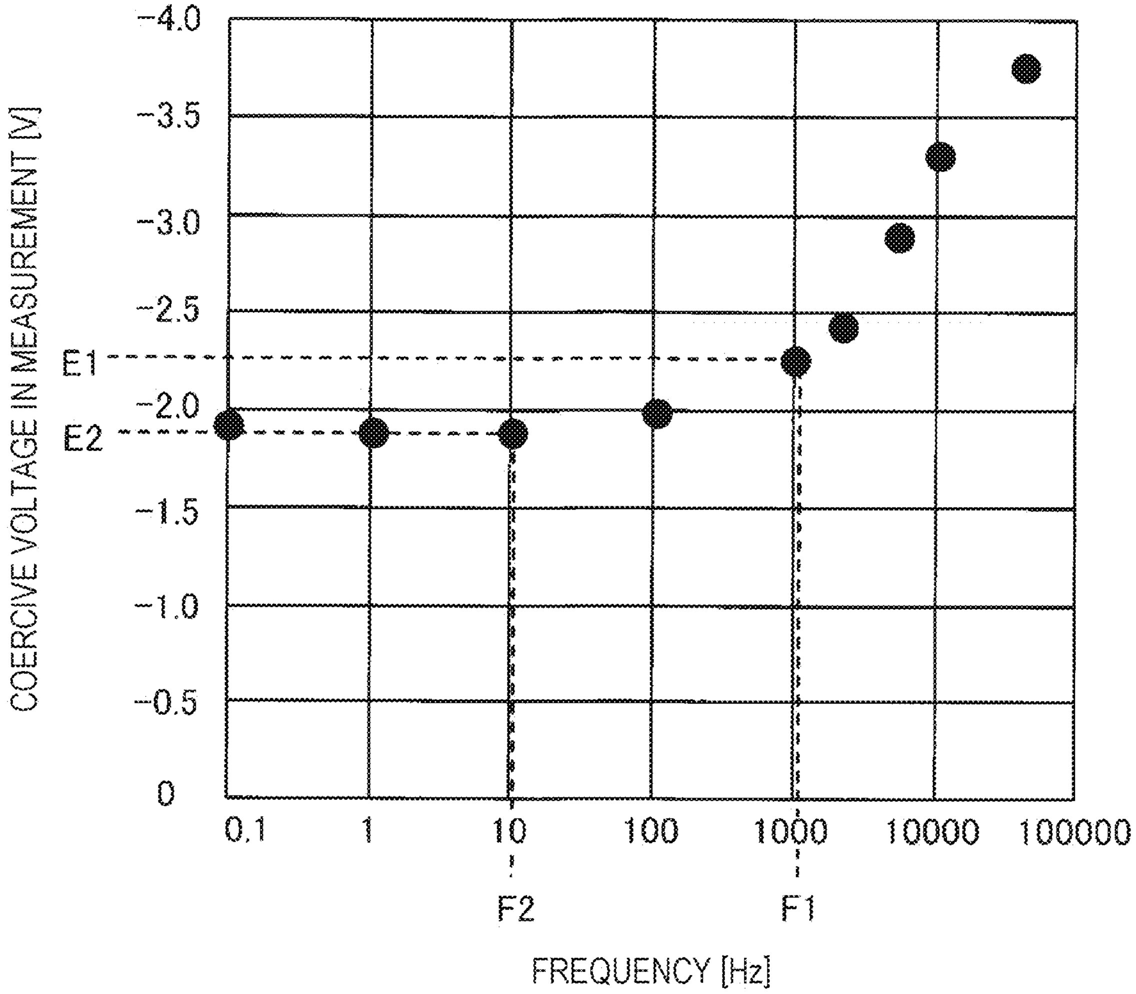
FIG. 10 is a graph illustrating the relationship between the drive frequency and the coercive voltage as a measurement value.

FIG. 10 is a graph illustrating the relationship between the drive frequency and the coercive voltage −Ec as the measurement value. As illustrated in FIG. 10, the coercive voltage −Ec as the measurement value is almost stable at approximately −1.9 [V] when the drive frequency is equal to or higher than 0.1 [Hz] and is lower than 100 [Hz]. The coercive voltage −Ec as the measurement value at these drive frequencies is close to the coercive voltage as the physical property value. In contrast, it turns out that, when the drive frequency becomes higher, the coercive voltage −Ec as the measurement value changes in a direction in which it becomes lower than −1.9 [V].

In particular, the coercive voltage −Ec as the measurement value at 1000 [Hz], i.e., 1 [kHz], or higher is significantly lower than the coercive voltage −Ec as the measurement value at a frequency equal to or higher than 0.1 [Hz] and lower than 100 [Hz]. That is, the coercive voltage −Ec as the measurement value at 1 [kHz] or higher is significantly lower than the coercive voltage as the physical property value. It is believed that a contribution of delay attributed to rate limiting of the circuit and the like is added in a high frequency band of 1 [kHz] or higher. By setting the minimum voltage EM in consideration of this change in the coercive voltage −Ec as the measurement value in the high frequency band, the amount of displacement of the piezoelectric element 44 and the diaphragm 36 can be made larger than that in the related art.

Here, the drive frequency of the piezoelectric body 443 at which the ink is ejected is defined as a first drive frequency F1. The coercive voltage −Ec of the piezoelectric body 443 obtained when the piezoelectric body 443 is driven at the first drive frequency F1 is defined as a first coercive voltage E1. A drive frequency lower than the first drive frequency F1 is defined as a second drive frequency F2. For example, the second drive frequency F2 is not the drive frequency at which the ink is ejected. The coercive voltage −Ec of the piezoelectric body 443 obtained when the piezoelectric body 443 is driven at the second drive frequency F2 is defined as a second coercive voltage E2. In this case, the minimum voltage EM, which is the difference between the reference voltage E0 and the minimum voltage Em as the minimum value of the drive voltage Com, is higher than the first coercive voltage E1 and is lower than the second coercive voltage E2. That is, the minimum voltage EM is set between the first coercive voltage E1 and the second coercive voltage E2.

Due to the setting of the minimum voltage EM in such a range, compared with the case in which it is out of the range, the amount of displacement of the piezoelectric element 44 can be made large in the range in which polarization reversal does not occur in high frequency driving. This allows piezoelectric body driving in which displacement characteristics are enhanced in high frequency driving. Thus, the amount of ink ejected can be made larger than that in the related art in high frequency driving. Accordingly, higher-quality printing performance compatible with high frequency driving at a higher level than in the related art can be provided.

Each of the first coercive voltage E1 and the second coercive voltage E2 is the coercive voltage −Ec in measurement and is different from the coercive voltage as the physical property value.

For example, 1000 [Hz] corresponds to the first drive frequency F1. A voltage of −2.3 [V] corresponds to the first coercive voltage E1. A frequency of 10 [Hz] corresponds to the second drive frequency F2. A voltage of −1.9 [V] corresponds to the second coercive voltage E2. In this case, the minimum voltage EM is set higher than −2.3 [V] and lower than −1.9 [V]. This can make the amount of displacement of the piezoelectric element 44 large in the range in which polarization reversal does not occur.

The first drive frequency F1 is not limited to 1000 [Hz] and may be any frequency as long as it is the drive frequency of the piezoelectric body 443 at which the ink is ejected. Furthermore, the second drive frequency F2 is not limited to 10 [Hz] and may be any frequency as long as it is lower than the first drive frequency F1.

Moreover, it is preferable that the minimum voltage EM, which is the difference between the reference voltage E0 and the minimum value of the drive voltage Com, be closer to the first coercive voltage E1 than to the second coercive voltage E2. That the minimum voltage EM is closer to the first coercive voltage E1 can make the amount of displacement of the piezoelectric element 44 large compared with the case in which the minimum voltage EM is closer to the second coercive voltage E2.

For example, when 1000 [Hz] corresponds to the first drive frequency F1 and 10 [Hz] corresponds to the second drive frequency F2, it is preferable to set the minimum voltage EM to a voltage closer to −2.3 [V] than to −1.9 [V]. By setting the minimum voltage EM to a voltage closer to −2.3 [V], the amount of displacement of the piezoelectric element 44 can be made large compared with the case in which the minimum voltage EM is set to a voltage closer to −1.9 [V].

Furthermore, it is preferable for the first drive frequency F1 to be higher than 1 [kHz]. At a high frequency of 1 [kHz] or higher, the coercive voltage −Ec in measurement readily changes in a direction in which it becomes lower than the coercive voltage in a normal frequency band and the coercive voltage as the physical property value. In view of this, it is preferable for the first drive frequency F1 to be higher than 1 [kHz].

In terms of the above, it is more preferable that the first drive frequency F1 be higher than 50 [kHz], and it is further preferable that it be higher than 80 [kHz]. As illustrated in FIG. 10, when the drive frequency exceeds 80 [kHz], the coercive voltage −Ec in measurement is significantly low compared with the coercive voltage −Ec in measurement when the drive frequency is equal to or higher than 0.1 [Hz] and is lower than 100 [Hz], i.e., falls within a normal frequency band. Thus, it is particularly preferable for the first drive frequency F1 to be higher than 80 [kHz].

Moreover, it is preferable for the second drive frequency F2 to be higher than 10 [Hz] and be lower than 100 [Hz]. When the second drive frequency F2 is equal to or lower than 10 [Hz], there is a possibility that it is difficult to obtain stable driving due to the influence of a leakage current compared with the case in which the second drive frequency F2 is higher than 10 [Hz]. When the second drive frequency F2 is higher than 100 [Hz], the setting range of the minimum voltage EM becomes very small depending on the value of the first drive frequency F1. This is not appropriate in terms of convenience.

Figure 11:
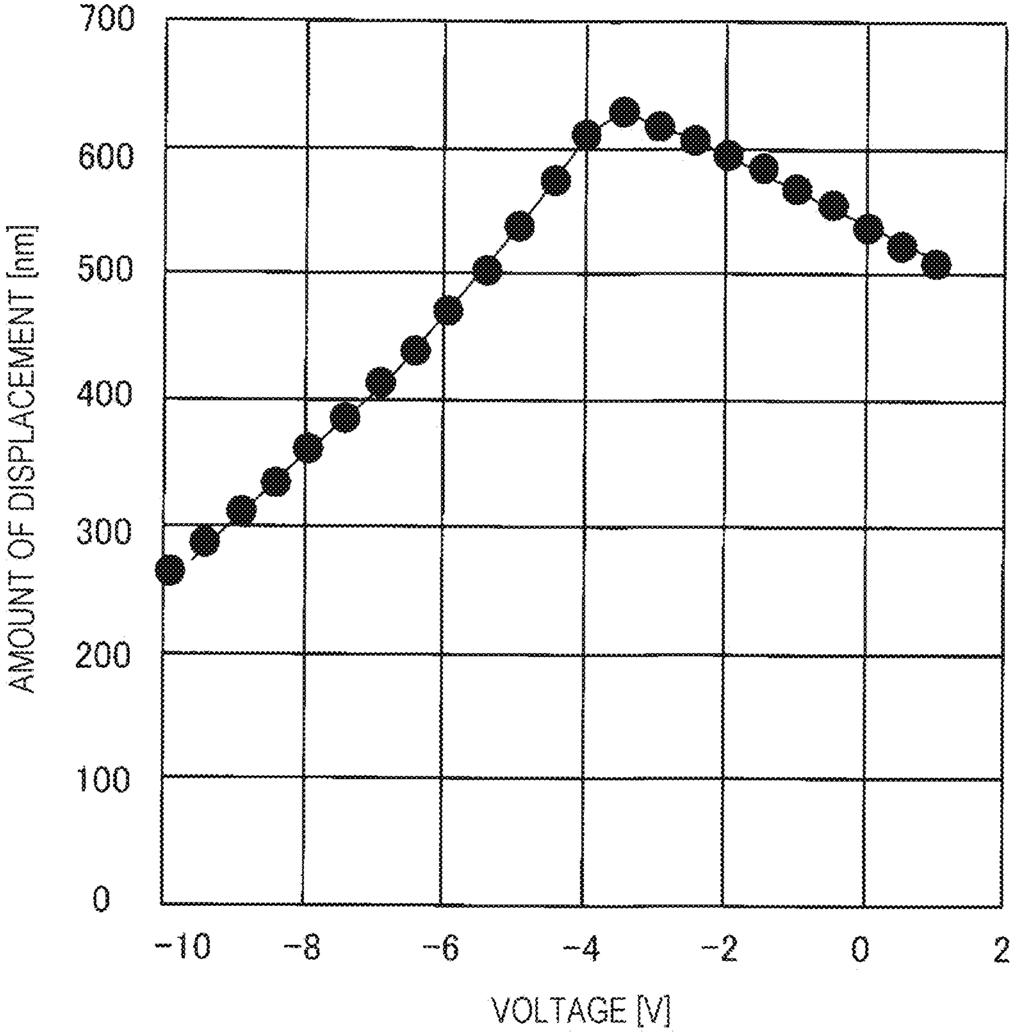
FIG. 11 is a graph illustrating evaluation results of the amount of displacement of a piezoelectric element.

FIG. 11 is a graph illustrating evaluation results of the amount of displacement of the piezoelectric element 44. FIG. 12 is a table illustrating the evaluation results of the amount of displacement of the piezoelectric element 44. The amount of displacement of the piezoelectric element 44 was evaluated by the following method. The evaluation results of FIGS. 11 and 12 are results for a drive frequency of 80 [KHz].

As measuring apparatuses, an arbitrary waveform generator AFG3022C (Tektronix), a voltage amplifier HAS4011 (NF Corporation), an oscilloscope HDO4024 (Teledyne Lecroy), and a laser displacement meter NLV-2500 (Polytec) were used. A voltage waveform illustrated in FIG. 6, obtained by outputting an electrical waveform from the arbitrary waveform generator and amplifying it by a factor of ten by the voltage amplifier, was applied to a piezoelectric element 44 with a plane area of 97680 $\mu m^2$. The amount of displacement of this piezoelectric element 44 was detected by the laser displacement meter. Then, the detected amount of displacement was converted to a voltage, and the voltage was captured into the oscilloscope.

The voltage range RE as the difference between the maximum voltage EN and the minimum voltage EM in FIG. 6 was fixed at 25 V. The minimum voltage EM was varied in a range of −10 [V] to 1 [V]. The intermediate voltage EK was set to the middle value between the maximum voltage EN and the minimum voltage EM, i.e., (EN−EM)/2. The changes from the intermediate voltage EK to the minimum voltage EM, from the minimum voltage EM to the maximum voltage EN, and from the maximum voltage EN to the intermediate voltage EK were each made in two microseconds. The holding times of the minimum voltage EM and the maximum voltage EN were each set to 98 microseconds. The following difference was regarded as the amount of displacement of the piezoelectric element 44: the difference between the numerical value of the laser displacement meter when 88 microseconds elapsed after the transition from the intermediate voltage EK to the minimum voltage EM and the numerical value of the laser displacement meter when 88 microseconds elapsed after the transition from the minimum voltage EM to the maximum voltage EN.

FIG. 12 is a table indicating the amount of displacement [nm] at several specific values of the minimum voltage EM in the results illustrated in FIG. 11. In the results illustrated in FIG. 11, the amount of displacement at −3.8 [V] is the largest. When the minimum voltage EM is lower or higher than −3.8 [V], the amount of displacement lowers. Furthermore, as is understood from FIG. 12, the amount of displacement is large in examples 1, 2, 3, and 4 compared with examples 5, 6, and 7. That is, it turns out that a large amount of displacement can be obtained when the minimum voltage EM is lower than −1.9 [V] compared with the case in which it is higher than −1.9 [V]. Moreover, as illustrated in FIG. 11, it turns out that the amount of displacement is large when the minimum voltage EM falls within a range of −4.2 [V] to −1.9 [V] compared with the case in which it is higher than −1.9 [V].

The evaluation results of FIGS. 11 and 12 are results for a drive frequency of 80 [kHz] as described above. As illustrated in FIG. 11, when the drive frequency was 80 [kHz], the maximum value, i.e., the peak, of the amount of displacement appeared at −3.8 [V].

Also when the drive frequency is a frequency other than 80 [kHz], a relationship similar to the relationship between the voltage and the amount of displacement illustrated in FIG. 11 is exhibited. Furthermore, the voltage corresponding to the peak of the amount of displacement at each drive frequency is as illustrated in FIG. 10. Therefore, for example, when the drive frequency is 10 [kHz], the peak of the amount of displacement appears at approximately −3.4 [V]. In addition, for example, when the drive frequency is 1 [kHz], the peak of the amount of displacement appears at approximately −2.3 [V].

As described above, the minimum voltage EM is set higher than the first coercive voltage E1 and lower than the second coercive voltage E2. This allows piezoelectric body driving in which displacement characteristics are enhanced in high frequency driving compared with the related art. Accordingly, higher-quality printing performance compatible with high frequency driving at a higher level than in the related art can be provided.

Furthermore, the same description as above applies to not only the case in which the piezoelectric body 443 is formed of PZT but also the case in which the piezoelectric body 443 is formed of another piezoelectric material, particularly a piezoelectric material having a perovskite crystal structure. That is, even with another piezoelectric material, high-quality printing performance compatible with high frequency driving can be provided by setting the minimum voltage EM higher than the first coercive voltage E1 and lower than the second coercive voltage E2.

2. Modifications

The embodiment given by way of example above can be variously modified. Specific forms of modifications that can be applied to the above-described embodiment will be given by way of example below. Any two or more forms selected from the following examples can be combined as appropriate in a range in which they do not mutually contradict.

In the above-described embodiment, the second drive frequency F2 is not the drive frequency at which the ink is ejected. That is, a mode other than the mode of driving the piezoelectric body 443 at a high frequency is not executed. However, as long as the mode of driving the piezoelectric body 443 at a high frequency is executed, even in a form in which a mode of driving the piezoelectric body 443 at a low frequency is executed in addition thereto, effects similar to those of the embodiment can be obtained in the mode of driving the piezoelectric body 443 at a high frequency. That is, the liquid ejecting apparatus 100 may be configured to switch between a first mode in which the piezoelectric body 443 is driven at the first drive frequency F1 and a second mode in which the piezoelectric body 443 is driven at the second drive frequency F2. Therefore, the liquid ejecting apparatus 100 may include the first mode in which the ink is ejected at the first drive frequency F1 and the second mode in which the ink is ejected at the second drive frequency F2.

The description of the above-described embodiment is based on the assumption that the drive voltage Com is a positive voltage; however, it may be a negative voltage. Also in this case, the applied voltage Ea is set based on an idea similar to the technical idea in the embodiment. In the above description, the "first coercive voltage" and the "second coercive voltage" are negative coercive voltages −Ec in measurement; however, they may be positive coercive voltages in measurement.

The "liquid ejecting head" may be a head of a circulation type having a so-called circulation flow path. Furthermore, the "liquid ejecting head" is not limited to a serial head and may be a line head.

The "liquid ejecting apparatus" can be employed for various kinds of equipment such as facsimile apparatuses and copy machines besides equipment used exclusively for printing. The use of the liquid ejecting apparatus is not limited to printing. For example, a liquid ejecting apparatus that ejects a solution of a color material is used as a manufacturing apparatus that forms a color filter of a display apparatus such as a liquid crystal display panel. Furthermore, a liquid ejecting apparatus that ejects a solution of an electrically conductive material is used as a manufacturing apparatus that forms wiring lines and electrodes of a wiring substrate. Moreover, a liquid ejecting apparatus that ejects a solution of a biological organic substance is used as, for example, a manufacturing apparatus that manufactures a biochip.

Although the present disclosure has been described above on the basis of the preferred embodiment, the present disclosure is not limited to the above-described embodiment. Furthermore, the configuration of each portion of the present disclosure can be replaced by any configuration that has a function similar to that in the above-described embodiment, and any configuration can be added thereto.

What is claimed is:

1. A liquid ejecting apparatus comprising:

a liquid ejecting head having a first electrode, a second electrode, and a piezoelectric body disposed between the first electrode and the second electrode; and a voltage applying section that drives the piezoelectric body to eject a liquid by applying a reference voltage that does not change with time to the first electrode and applying a drive voltage that changes with time to the second electrode, wherein when a drive frequency of the piezoelectric body at which the liquid is ejected is defined as a first drive frequency, a coercive voltage of the piezoelectric body obtained when the piezoelectric body is driven at the first drive frequency is defined as a first coercive voltage, a drive frequency lower than the first drive frequency is defined as a second drive frequency, and a coercive voltage of the piezoelectric body obtained when the piezoelectric body is driven at the second drive frequency is defined as a second coercive voltage, a difference between the reference voltage and a minimum value of the drive voltage is higher than the first coercive voltage and is lower than the second coercive voltage.

2. The liquid ejecting apparatus according to claim 1, wherein the difference between the reference voltage and the minimum value of the drive voltage is closer to the first coercive voltage than to the second coercive voltage.

3. The liquid ejecting apparatus according to claim 1, wherein the first drive frequency is higher than 1 [kHz].

4. The liquid ejecting apparatus according to claim 3, wherein the first drive frequency is higher than 50 [kHz].

5. The liquid ejecting apparatus according to claim 3, wherein the first drive frequency is higher than 80 [kHz].

6. The liquid ejecting apparatus according to claim 1, wherein the second drive frequency is higher than 10 [Hz] and is lower than 100 [Hz].

7. The liquid ejecting apparatus according to claim 1, wherein the second drive frequency is not the drive frequency at which the liquid is ejected.

8. The liquid ejecting apparatus according to claim 1, wherein the liquid ejecting apparatus is configured to switch between a first mode in which the piezoelectric body is driven at the first drive frequency and a second mode in which the piezoelectric body is driven at the second drive frequency.

* * * * *